United States Patent
Cheung et al.

(10) Patent No.: US 12,167,730 B2
(45) Date of Patent: Dec. 17, 2024

(54) STABLE AGRICULTURAL COMPOSITIONS

(71) Applicant: Valent U.S.A. LLC, San Ramon, CA (US)

(72) Inventors: Tak Wai Cheung, Mountain House, CA (US); Ke Zhou, San Ramon, CA (US)

(73) Assignee: VALENT U.S.A., LLC, San Ramon, CA (US)

( * ) Notice: Subject to any disclaimer, the term of this patent is extended or adjusted under 35 U.S.C. 154(b) by 0 days.

(21) Appl. No.: 18/071,809

(22) Filed: Nov. 30, 2022

(65) Prior Publication Data

US 2023/0165249 A1    Jun. 1, 2023

Related U.S. Application Data

(60) Provisional application No. 63/284,214, filed on Nov. 30, 2021.

(51) Int. Cl.
| | | |
|---|---|---|
| *A01N 41/10* | (2006.01) | |
| *A01N 25/04* | (2006.01) | |
| *A01N 25/10* | (2006.01) | |
| *A01N 43/54* | (2006.01) | |
| *A01N 43/80* | (2006.01) | |

(52) U.S. Cl.
CPC ............ *A01N 41/10* (2013.01); *A01N 25/04* (2013.01); *A01N 25/10* (2013.01); *A01N 43/54* (2013.01); *A01N 43/80* (2013.01)

(58) Field of Classification Search
CPC ........ A01N 41/10; A01N 25/04; A01N 25/10; A01N 43/54; A01N 43/80; A01N 25/30; A01P 13/00
See application file for complete search history.

(56) References Cited

U.S. PATENT DOCUMENTS

| | | | |
|---|---|---|---|
| 6,165,939 A * | 12/2000 | Agbaje ................. | A01N 43/70 504/105 |
| 6,453,608 B1 * | 9/2002 | Flanagan ................ | A01C 1/06 47/57.6 |
| 9,635,855 B2 * | 5/2017 | van der Krieken .... | A01N 43/90 |
| 10,806,148 B2 | 10/2020 | Rupak et al. | |
| 2019/0200615 A1 | 7/2019 | Tanuwidjaja et al. | |
| 2019/0375725 A1 * | 12/2019 | Zhang .................... | A01N 43/58 |

FOREIGN PATENT DOCUMENTS

WO    WO-2021055303 A1 *    3/2021    ............ A01N 25/04

OTHER PUBLICATIONS

International Search Report and Written Opinion for corresponding PCT Application No. PCT/US2022/051313 mailed Mar. 9, 2023.

* cited by examiner

*Primary Examiner* — Benjamin J Packard
*Assistant Examiner* — Joshua A Atkinson
(74) *Attorney, Agent, or Firm* — Wood, Phillips, Katz, Clark & Mortimer

(57) ABSTRACT

The present invention is directed to agricultural compositions comprising at least one agriculturally active ingredient and gellan gum. The present invention is further directed to tank mixes comprising a high electrolyte composition comprising at least one agriculturally active ingredient and a second composition comprising at least one agriculturally active ingredient, wherein gellan gum is present in the high electrolyte composition or the second composition or is added to the tank mix.

9 Claims, No Drawings

STABLE AGRICULTURAL COMPOSITIONS

FIELD OF THE INVENTION

The present invention is directed to agricultural compositions comprising at least one agriculturally active ingredient and gellan gum. The present invention is further directed to tank mixes comprising a high electrolyte composition comprising at least one agriculturally active ingredient and a second composition comprising at least one agriculturally active ingredient, wherein gellan gum is present in the high electrolyte composition or the second composition or is added to the tank mix.

BACKGROUND OF THE INVENTION

Suspo-emulsion compositions are a mixture of water-insoluble active ingredients dispersed in an aqueous solution, where one (or more) of the active ingredients is in suspension form and one (or more) of the active ingredients is in emulsion form. These formulations are notoriously difficult to maintain as stable compositions. Suspo-emulsions are often tank mixed with high electrolyte compositions adding another layer of difficulty in maintaining stable compositions.

High electrolyte compositions are particularly troublesome for agricultural formulators. Agriculturally active ingredients that have poor water solubility are formulated in suspension concentrates that are then mixed with high electrolyte compositions such as fertilizers or other actives that in certain forms result in high concentration of electrolytes. When agricultural active ingredients in suspension concentrates are mixed or diluted into the high electrolyte composition, rapid flocculation of the composition often occurs. This flocculation is highly undesirable as the resulting product blocks the nozzles of application equipment and or results in uneven application.

RoundUp Powermax® available from Monsanto is one particularly prominent high electrolyte composition. RoundUp Powermax® has become widely used in areas in need of weed control. For example, there are many varieties of agricultural crops, such as soybeans, corn, cotton and wheat that are resistant to Roundup Powermax® making its use to control weeds among these crops ideal. However, the significant increase in the area where glyphosate is applied leads to an increase in the potential infestation of glyphosate-resistance weeds. For controlling glyphosate-resistant weeds, Roundup Powermax® is often added to tank mixes of other herbicidal formulations having a different mode of action.

Thus, there is a need in the art for stable agricultural compositions.

SUMMARY OF THE INVENTION

In one embodiment, the present invention is directed to agricultural compositions comprising at least one agriculturally active ingredient and gellan gum.

In another embodiment, the present invention is directed to tank mixes comprising a high electrolyte composition comprising at least one agriculturally active ingredient and a second composition comprising at least one agriculturally active ingredient, wherein gellan gum is present in the high electrolyte composition or the second composition or is added to the tank mix.

In another embodiment, the present invention is directed to methods of controlling a weed comprising applying a composition or tank mix of the present invention to the weed or an area in need of weed control.

DETAILED DESCRIPTION OF THE INVENTION

Applicant has surprisingly discovered a thickening agent capable of providing highly stable agricultural compositions. There are dozens of commercially available thickening agents aimed at use in agricultural formulations and specifically at use in high electrolyte compositions. However, not every formulation, especially suspension concentrates and even more especially suspo-emulsions and high electrolyte compositions are capable of being maintained in a stable state. This instability is often due to a lack of available thickening agent capable of preventing physical stability issues such as flocculation. Gellan gum is currently used as a thickener in food products and pharmaceuticals. However, its efficacy in agricultural formulations is unknown. Applicant has unexpectedly discovered that gellan gum is able to provide stable agricultural compositions, including suspo-emulsions. Gellan gum further unexpectedly provided compatibility with high electrolyte compositions.

In one embodiment, the present invention is directed to agricultural compositions comprising at least one agriculturally active ingredient and gellan gum.

In a preferred embodiment, the agricultural composition is a suspension concentrate, suspo-emulsion or a high electrolyte composition.

In another embodiment, the present invention is directed to tank mixes comprising a high electrolyte composition comprising at least one agriculturally active ingredient and a second composition comprising at least one agriculturally active ingredient, wherein gellan gum is present in the high electrolyte composition or the second composition or is added to the tank mix.

Gellan gum (CAS #71010-52-1) is a water-soluble anionic polysaccharide produced by fermentation of *Sphingomonas elodea*. Gellan gum is commercially available from CPKelco under the tradenames Gelzan® and Kelcogel® and from Roth under the tradename Gelrite®.

As used herein, the phrase "high electrolyte composition", is a composition that contains at least about 0.1 M of a water-soluble salt and or has a conductivity of about 1 millisiemen per centimeter ("mS/cm") or more. In a preferred embodiment the high electrolyte compositions of the present invention have a conductivity of about 10 mS/cm or more, more preferably about 50 mS/cm or more, even more preferably about 100 mS/cm or more, yet even more preferably about 1 siemen per centimeter ("S/cm") or more, yet even more preferably about 5 S/cm or more and yet even more preferably about 10 S/cm or more.

As used herein, the phrase "agriculturally active ingredient", is defined as a compound that affects the viability and or growth of a plant. In a preferred embodiment, agriculturally active ingredients of the present invention are selected from the group consisting of pesticides, plant growth regulators and fertilizers.

In a preferred embodiment, the compositions of the present invention have a pH from about 2 to about 7.

In another preferred embodiment, compositions of the present invention further comprise one or more excipients selected from the group consisting of one or more solvents, one or more surfactants and one or more emulsifiers.

In another preferred embodiment, the one or more solvents is selected from the group consisting of heavy aromatic naphtha, a water-insoluble aromatic ester solvent, a morpholine amide of a C8,10 fatty acid and acetyl tributyl citrate.

Commercially available representatives of solvents of the present invention include, but are not limited to: Aromatic 200ND (CAS #64742-94-5; heavy aromatic naphtha available from ExxonMobil); Jeffsol® AG 1700 (a water-insoluble aromatic ester solvent available from Huntsman Corporation; Jeffsol® AG 1700 has a flash point of 106° C., a boiling point of 249° C., a freezing point of −22° C. and a density of 1.01 g/mL); Jeffsol® AG 1730 (a morpholine amide of a C8,10 fatty acid available from Huntsman Corporation); and Citroflex® A-4 (CAS #77-90-7; acetyl tributyl citrate available from Vertellus).

The one or more solvents may be present in compositions of the present invention at a concentration from about 1% to about 30% w/w, preferably from about 10% to about 20% w/w, and more preferably from about 12% to about 17% w/w.

In another preferred embodiment, the one or more surfactants is selected from the group consisting of an alkylphenol ethoxylate free nonionic wetter, dispersant package and a 35% graft copolymer, a graft copolymer having an aromatic-substituted backbone and hydrophilic pendant groups, sodium dioctyl sulfosuccinate and a potassium salt of polyoxyethylene tristyrylphenol phosphate.

Commercially available representatives of solvents of the present invention include, but are not limited to: Atlox® 4894 (an alkylphenol ethoxylate free nonionic wetter and dispersant package available from Croda Americas LLC); Atlox® 4913 (a proprietary 35% graft copolymer available from Croda Americas LLC); Tersperse® 2612 (a graft comb polymer available from Huntsman Petrochemical Corporation having an aromatic-substituted backbone and hydrophilic pendant groups, in a glycol ether solvent); Stepfac™ TSP PE-K (polyoxyethylene tristyrylphenol phosphate, potassium salt available from Stepan Corp); Multiwet® MO70R-LQ-(AP) (sodium dioctyl sulfosuccinate available from Croda); Tersperse® 2500 (a 35% graft copolymer available from Huntsman Petrochemical corporation) and Agrilan® 1028 (an optimized phosphate ester available from Nouryon).

The one or more surfactants may be present in compositions of the present invention at a concentration from about 1% to about 20% w/w and preferably from about 2% to about 10% w/w.

In another preferred embodiment, the one or more emulsifiers is selected from the group consisting of a poly(ethylene oxide)-poly(propylene oxide)-poly(ethylene oxide) block copolymer having an average molecular weight of 5900 and a hydrophile weight percentage of 40%, a poly(ethylene oxide)-poly(propylene oxide)-poly(ethylene oxide) block copolymer having an average molecular weight of 3650 and a hydrophile weight percentage of 20%, calcium salt of 4-(4,6,8-trimethyl-3-nonanyl)benzenesulfate, a sorbitan monooleate ethoxylate, polyvinyl alcohol, an alkylphenol ethoxylate free nonionic wetter and dispersant package and PEG-10 tallate.

Commercially available representatives of emulsifiers of the present invention include, but are not limited to: Pluronic® P104 (a poly(ethylene oxide)-poly(propylene oxide)-poly(ethylene oxide) block copolymer available from BASF Corporation), Pluronic® P104 has an average molecular weight of 5900 and a hydrophile weight percentage of 40%; Pluronic® L92 (a poly(ethylene oxide)-poly(propylene oxide)-poly(ethylene oxide) block copolymer available from BASF Corporation), Pluronic® L92 has an average molecular weight of 3650 and a hydrophile weight percentage of 20%; Toximul® SEE-341 (CAS #9005-65-6; a sorbitan monooleate ethoxylate available from Stepan); Ninate® 401-A (CAS #68953-96-8; 4-4,6,8-Trimethyl-3-nonanyl)benzenesulfate, calcium salt available from Stepan); and Ninex® MT-610 (CAS #61791-00-2; PEG-10 tallate available from Stepan).

The one or more emulsifiers may be present in compositions of the present invention at a concentration from about 1% to about 10% w/w, preferably from about 1% to about 5% w/w, and more preferably from about 1% to about 3% w/w.

In another embodiment, the present invention is directed to methods of controlling weeds comprising applying a composition of the present invention to the weeds or an area in need of weed control.

In another preferred embodiment, the compositions of the present invention may be applied sequentially or concurrently with glyphosate, glufosinate, dicamba, 2,4-D and mixtures thereof to control weeds.

The compositions of the present invention can be applied to any environment in need of weed control. The environment in need of weed control may include any area that is desired to have a reduced number of weeds or to be free of weeds. For example, the composition can be applied to an area used to grow crop plants, such as a field, orchard, or vineyard. For example, compositions and methods of the present invention can be applied to areas where soybeans, corn, peanuts, and cotton are growing. In a preferred embodiment, the composition is applied in an area where a broadleaf crop (soybean, cotton, peanut, orchard, vineyard, forages) is growing. The compositions of the present invention can also be applied to non-agricultural areas in need of weed control such as lawns, golf courses, or parks.

The compositions of the present invention can be applied by any convenient means. Those skilled in the art are familiar with the modes of application that include foliar applications such as spraying, chemigation (a process of applying the composition through the irrigation system), by granular application, or by impregnating the composition on fertilizer.

The compositions of the present invention can be prepared as concentrate formulations or as ready-to-use formulations. The compositions can be tank mixed.

The compositions and methods of the present invention can be applied successfully to crop plants and weeds that are resistant to glyphosate, glufosinate, or other herbicides. The composition and methods can also be applied to areas where genetically modified crops ("GMOs") or non-GMO crops are growing. The term "GMO crops" as used herein refers to crops that are genetically modified.

The compositions and methods of the present invention may be used for pre-emergence control of weeds.

The compositions and methods of the present invention may be used to increase the speed of glyphosate control of weeds during post-emergence application.

The compositions and methods of the present invention may be used to increase the speed of glyphosate control of weeds during a burn-down application.

As used herein "burn-down" refers to applying a pesticide to weeds post-emergence but prior to emergence of crops.

Throughout the application, the singular forms "a," "an," and "the" include plural reference unless the context clearly dictates otherwise.

As used herein, all numerical values relating to amounts, weight percentages and the like are defined as "about" or "approximately" each particular value, plus or minus 10%.

For example, the phrase "at least 5.0% by weight" is to be understood as "at least 4.5% to 5.5% by weight." Therefore, amounts within 10% of the claimed values are encompassed by the scope of the claims.

These representative embodiments are in no way limiting and are described solely to illustrate some aspects of the invention.

Further, the following examples are offered by way of illustration only and not by way of limitation.

EXAMPLES

Example 1—Preparation of Suspo-Emulsion Composition

TABLE 1

| Composition (% w/w) | A | B |
|---|---|---|
| Mesotrione (99.8%) | 11.43 | 11.43 |
| Pyroxasulfone (99.5%) | 4.93 | 4.93 |
| Epyrifenacil (98%) | 1.10 | 1.10 |
| Aromatic 200ND | 16.53 | 16.53 |
| Atlox ® 4894 | 1.0 | 1.0 |
| Atlox ® 4913 | 2.0 | 2.0 |
| Xiameter ® AFE 0300 | 0.2 | 0.2 |
| Veegum ® R | 0.75% | 0.4% |
| Proxel ® GXL | 0.2 | 0.2 |
| Propylene glycol | 5.0 | 5.0 |
| Pluronic ® L92 | 2.0 | 2.0 |
| Water | Q.S. | Q.S. |
| Total | 100 | 100 |

Aromatic 200ND (CAS # 64742-94-5) is heavy aromatic naphtha available from Exxon-Mobil.
Xiameter ® AFE 0300 is a silicone-based antifoaming agent available from Dow Corning Corporation.
Veegum ® R (CAS #1302-78-9 or #12199-37-0) is magnesium aluminum silicate available from Vanderbilt Minerals, LLC.
Proxel ® GXL is 19.3% 1,2-benzisothiazolin-3-one available from Lonza.
Atlox ® 4894 is an alkylphenol ethoxylate free nonionic wetter and dispersant package available from Croda Americas LLC.
Atlox ® 4913 is a proprietary 35% graft copolymer available from Croda Americas LLC.
Pluronic ® L92 is a poly(ethylene oxide)-poly(propylene oxide)-poly(ethylene oxide) block copolymer available from BASF Corporation. Pluronic ® L92 has an average molecular weight of 3650 and a hydrophile weight percentage of 20%.

Method

Mesotrione and pyroxasulfone were mixed together in a formulation containing Atlox® 4894 and 4913, Xiameter® AFE 0300, Veegum® R, Proxel® GXL, propylene glycol and water to form a suspension concentrate composition. Epyrifenacil was suspended in aromatic 200ND in the presence of Pluronic® L92 and water to form an emulsion-in-water composition. The suspension concentrate formulation and emulsion-in-water composition were then homogenized at a near 1:1 (12:13) ratio in the presence of additional water to form a suspo-emulsion as shown in Table 1, above, and tested for viscosity.

The rheological properties including viscosity, G', G" was measured using Haak Mars Modular Advanced Rheometer System made by Thermo Scientific, model number: MARS 2. Results are shown in Table 2, below.

TABLE 2

| 20° C. | Composition A | Composition B |
|---|---|---|
| Viscosity at shear rate 1 S$^{-1}$ (mPa) | 12400 | 3150 |
| Viscosity at shear rate 50 S$^{-1}$ (mPa) | 553.7 | 234 |
| G' (t = 0.1 Pa) | 577.8 | 277.3 |
| G" (t = 0.1 Pa) | 159.3 | 91.24 |
| G'/G" | 3.63 | 3.04 |

Results

As seen in Table 2, above, the use of 0.75% w/w Veegum® R resulted in a composition that was too thick. Reduction of Veegum® R to 0.4% w/w maintained an agriculturally acceptable viscosity. However, Veegum® R alone is not compatible with a high electrolyte composition. Thus, additional thickening agents were tested for compatibility with a high electrolyte composition as shown in Example 2, below.

Example 2—Selection of Additional Thickening Agent for Compatibility with High Electrolyte Composition

TABLE 3

| Composition (% w/w) | C | D | E | F | G | H |
|---|---|---|---|---|---|---|
| Mesotrione (99.8%) | 11.43 | 11.43 | 11.43 | 11.43 | 11.43 | 11.43 |
| Pyroxasulfone (99.5%) | 4.93 | 4.93 | 4.93 | 4.93 | 4.93 | 4.93 |
| Epyrifenacil (98%) | 1.10 | 1.10 | 1.10 | 1.10 | 1.10 | 1.10 |
| Aromatic 200ND | 16.53 | 16.53 | 16.53 | 16.53 | 16.53 | 16.53 |
| Atlox ® 4894 | 1.0 | 1.0 | 1.0 | 1.0 | 1.0 | 1.0 |
| Atlox ® 4913 | 2.0 | 2.0 | 2.0 | 2.0 | 2.0 | 2.0 |
| Xiameter ® AFE 0300 | 0.2 | 0.2 | 0.2 | 0.2 | 0.2 | 0.2 |
| Veegum ® R | 0.4% | 0.4% | 0.4% | 0.4% | 0.4% | 0.4% |
| Proxel ® GXL | 0.2 | 0.2 | 0.2 | 0.2 | 0.2 | 0.2 |
| Propylene glycol | 5.0 | 5.0 | 5.0 | 5.0 | 5.0 | 5.0 |
| Pluronic ® L92 | 2.0 | 2.0 | 2.0 | 2.0 | 2.0 | 2.0 |
| Gellan gum | 0.11% | — | — | — | — | — |
| Rhodopol ® 50 MD | — | 0.38% | — | — | — | — |
| Kelzan ® AP | — | — | 0.41% | — | — | — |
| Kelzan ® CC | — | — | — | 0.3% | — | — |
| Supercol ® U | — | — | — | — | 0.29% | — |
| N-Hance ™ HP 40S | — | — | — | — | — | 0.36% |
| Water | Q.S. | Q.S. | Q.S. | Q.S. | Q.S. | Q.S. |
| Total | 100 | 100 | 100 | 100 | 100 | 100 |

Rhodopol ® 50 MD is a xanthan gum available from Solvay.
Kelzan ® AP is a xanthan gum available from CP Kelco.
Supercol ® U is a guar gum extracted from guar endosperm available from Hercules LLC.
N-Hance ™ HP 40 S is a hydroxypropyl guar and is available from Hercules LLC.
Kelzan ® BT is a xanthan gum available from CP Kelco.

Method

Compositions C-H of Table 3, above, were formulated as described in Example 1 except an additional thickening agent was added with the additional water to form a suspo-emulsion. The compositions were then tested for compatibility with RoundUp Powermax®, a high electrolyte composition. Specifically, to a 100 ml graduated cylinder, 93 g tap water was added with 2.5 grams of one of Compositions C-H. Then, 5.5 grams of RoundUp Powermax® was added to form a mixture. The mixture was mixed thoroughly, then left undisturbed for 24 hours. Following the 24-hour storage sedimentation was observed and recorded along with the number of inversions to re-disperse the mixture. The mixture was then poured onto 100 mesh and 50 mesh screen and rinsed by tap water. The amount of large particles that could not pass through the screen were observed and recorded. Results are shown in Table 4, below.

TABLE 4

| Comp. | Sedimentation (24 hours) Ranked (Best-Worst) | # of Inversions (24 hours) | 100 mesh Screen | 50 mesh Screen |
|---|---|---|---|---|
| C | 5$^{th}$-tied | 3 | Low Flocculation | Very low Flocculation |
| D | 5$^{th}$-tied | 6 | High Flocculation | High Flocculation |
| E | 4th | 2 | High Flocculation | High Flocculation |
| F | 3rd | 5 | Medium Flocculation | Medium Flocculation |
| G | 2nd | >100 | High Flocculation | High Flocculation |
| H | 1st | >100 | High Flocculation | High Flocculation |

Results

As seen in Table 4, above, Composition C, containing gellan gum demonstrated an unexpectedly high compatibility with high electrolyte compositions.

Example 3—Further Selection of Additional Thickening Agent for Compatibility with High Electrolyte Composition Method Compositions C and F of Table 3, above, were formulated as described in Example 1 except an additional thickening agent was added with the additional water to form a suspo-emulsion. The compositions were then tested for compatibility with RoundUp Powermax®. Specifically, to a 500 ml graduated cylinder, 465 g tap water was added with 210 grams of one of Compositions C or G. Then, 25 grams of RoundUp Powermax® was added to form a mixture. The mixture was mixed thoroughly, then left undisturbed for 24 hours. Following the 24-hour storage number of inversions to re-disperse the mixture (i.e. re-dispersibility) was recorded. The mixture was then poured onto 100 mesh and 50 mesh screen and rinsed by tap water. The amount of large particles that could not pass through the screen were observed and recorded. Results are shown in Table 5, below.

TABLE 5

| Comp. | # of Inversions (24 hours) | 100 mesh Screen | 50 mesh Screen |
|---|---|---|---|
| C | 8 | Thin layer | Clean |
| G | >100 | Ring at Bottom | Ring at Bottom |

Results

As seen in Table 5, above, Composition C, containing gellan gum, demonstrated an unexpectedly high compatibility with high electrolyte compositions.

Example 4—Gellan Gum as Thickener in a Suspension Concentrate

TABLE 6

| Composition (% w/w) | I |
|---|---|
| Flumiclorac Pentyl | 6.34 |
| Pyroxasulfone (99.2%) | 18.38 |
| Tersperse ® 2500 | 6.0 |
| Multiwet ® MO70R-LQ-(AP) | 1.0 |
| Propylene glycol | 7.0 |
| Xiameter ® AFE 0300 | 0.2 |
| Veegum ® R | 0.5 |
| Proxel ® GXL | 0.24 |
| Gellan gum | 0.1 |
| Water | Q.S. |

TABLE 6-continued

| Composition (% w/w) | I |
|---|---|
| Total | 100 |

Tersperse ® 2500 is a 35% graft copolymer available from Huntsman Petrochemical Corporation.
Multiwet ® MO70R-LQ-(AP) is sodium dioctyl sulfosuccinate available from Croda.

Methods

Composition I from Table 6, above, was formulated to create a suspension concentrate composition. The composition was stored for 2 months at 40° C. after which syneresis, bottom clear time, pH, sprayability, dispersibility, re-dispersibility, particle size, suspensibility and viscosity (rheology) were measured. Results of this study are shown in Table 7, below.

Syneresis

Syneresis was determined by placing the composition in a 125-milliliter high density polyethylene (HDPE) bottle at the above-mentioned storage conditions. The height of the top clear liquid phase was then measured. Syneresis is calculated using the following equation: Height of top clear liquid phase/height of total sample.

A high syneresis value indicates poor formulation stability.

Bottom Clear Time

Bottom clear time is the time until the composition flows away from the container bottom when 62.5 milliliters of the composition is placed in a 125-milliliter plastic jar and placed on its side. A high bottom clear time indicates poor flowability stability.

Sprayability

Sprayability is based on the following test procedure and calculation. A 100-mesh (150 micrometer) sieve is weighed and the weight is recorded as the tare weight ("W0"). The sieve is then placed over a wide mouth jar.

50 grams of a composition ("W") is weighed and added to 600 milliliters of tap water, the composition was then stirred for approximately two minutes to create a dispersion.

The entire dispersion was poured through the sieve followed by rinsing. Rinsing was done using tap water at a flow rate at about 1.5 liters per minute for one minute. The sieve with the residue was then placed in a drying oven and dried to create the dry sieve with the residue ("W1"). Percent sprayability was then calculated with the following equation: (W1−W0)/W*100.

A large percent sprayability indicates poor formulation stability leading to nozzle clogging during field application. Formulation should have a sprayability no more than 0.05% w/w under all conditions.

Dispersibility

Dispersibility was measured by adding one milliliter of a composition to a 100-milliliter graduated cylinder containing 99 milliliters of 324 parts per million hard water. The cylinder was then run through cycles of inversion and reversion with one complete cycle every 2 seconds. Dispersibility is the number of cycles it takes to disperse the formulation uniformly. A high dispersibility value indicates poor formulation stability.

Re-Dispersibility

After the dispersibility test is done, the dispersed formulation was undisturbed for 24 hours. The cylinder was then run through cycles of inversion and reversion with one complete cycle every two seconds. Re-dispersibility is the number of cycles it takes to disperse the formulation uniformly after sitting. A high redispersibility value indicates poor formulation stability.

Physical Stability

Physical stability is determined by particle size. Particle sizes were measured for each composition. D (v, 0.1), D (v, 0.5) and D (v, 0.9) values were measured. D (v, X) denotes the proportion of particles whose diameter measured below the given value in microns.

Suspensibility

Suspensibility is based on the following test procedure and calculation. One gram of a composition ("W") was added to 50 milliliters of tap water in a beaker and left undisturbed until the composition was thoroughly wet. Once wet the composition was stirred for approximately two minutes to create a dispersion.

The entire dispersion was transferred into a 100-milliliter graduated cylinder. The cylinder was then filled to the 100-milliliter mark using 324 parts per million hard water. The cylinder was run through 30 cycles of inversion and reversion with one complete cycle every two seconds. The graduated cylinder was then left undisturbed for 30 minutes. Following rest, the top 90 milliliters were removed from the cylinder using a vacuum apparatus. The remaining 10 milliliters of material was then transferred into a tared evaporation dish ("W0"). The dish with the material was placed in a drying oven and dried to a constant weight ("W1"). Percent suspensibility was calculated using the following equation: ((W*A/100)−(W1−W0))*111/(W*A/100), wherein A=percentage of solid content in the sample (determined from the formulation of the composition).

A low percent suspensibility indicates poor formulation stability leading to precipitation of the composition.

Rheology Properties

The rheological properties including viscosity, G', G" was measured using Haak Mars Modular Advanced Rheometer System made by Thermo Scientific, model number: MARS 2.

TABLE 7

| Composition I | 2 months at 40° C. |
| --- | --- |
| Syneresis | 11.27% |
| Bottom Clear Time | 1 |
| pH | 5.46 |
| Sprayability | 0.0064% |
| Dispersibility | 2 |
| Re-Dispersibility | 1/11 |
| D (v, 0.1) | 0.874 |
| D (v, 0.5) | 2.01 |
| D (v, 0.9) | 4.459 |
| Suspensibility | 94.16% |
| Viscosity at shear rate 1 $S^{-1}$ (mPa) | 594.2 |
| Viscosity at shear rate 50 $S^{-1}$ (mPa) | 62.83 |
| G' (t = 0.1 Pa) | 3.845 |
| G" (t = 0.1 Pa) | 1.644 |
| G'/G" | 2.34 |

As shown Table 7, above, Composition I, containing gellan gum as the thickening agent, has re-dispersibility of 1/11, well within the specification of <30. Thus, gellan gum demonstrated an unexpectedly high compatibility with suspension concentrate compositions.

What is claimed is:

1. An agricultural composition comprising at least one agriculturally active ingredient and gellan gum, wherein the composition is selected from the group consisting of a suspension concentrate, a suspo-emulsion and a high electrolyte composition.

2. The composition of claim 1, wherein the at least one agriculturally active ingredient is selected from the group consisting of pesticides, plant growth regulators and fertilizers.

3. The composition of claim 1, further comprising one or more excipients selected from the group consisting of one or more solvents one or more surfactants and one or more emulsifiers.

4. The composition of claim 3, wherein the one or more solvents is selected from the group consisting of heavy aromatic naphtha, a water-insoluble aromatic ester solvent, a morpholine amide of a C8,10 fatty acid and acetyl tributyl citrate.

5. The composition of claim 3, wherein the one or more surfactants is selected from the group consisting of an alkylphenol ethoxylate free nonionic wetter, dispersant package and a 35% graft copolymer, a graft copolymer having an aromatic-substituted backbone and hydrophilic pendant groups, sodium dioctyl sulfosuccinate and a potassium salt of polyoxyethylene tristyrylphenol phosphate.

6. The composition of claim 3, wherein the one or more emulsifiers is selected from the group consisting of a poly(ethylene oxide)-poly(propylene oxide)-poly(ethylene oxide) block copolymer having an average molecular weight of 5900 and a hydrophile weight percentage of 40%, a poly(ethylene oxide)-poly(propylene oxide)-poly(ethylene oxide) block copolymer having an average molecular weight of 3650 and a hydrophile weight percentage of 20%, calcium salt of 4-(4,6,8-trimethyl-3-nonanyl)benzenesulfate, a sorbitan monooleate ethoxylate, polyvinyl alcohol, an alkylphenol ethoxylate free nonionic wetter and dispersant package and PEG-10 tallate.

7. A method of controlling a weed comprising applying the composition of claim 1 to the weed or an area in need of weed control.

8. A tank mix comprising:
a high electrolyte composition comprising at least one agriculturally active ingredient;
and a second composition comprising at least one agriculturally active ingredient, wherein gellan gum is present in the high electrolyte composition or the second composition or is added to the tank mix.

9. A method of controlling a weed comprising applying the tank mix of claim 8 to the weed or an area in need of weed control.

\* \* \* \* \*